3,453,104
PROCESS FOR MAKING POROUS MATERIALS

Vincent S. de Marchi, Saratoga, Alfred S. Neiman, Menlo Park, and Henry F. Wigton, Palo Alto, Calif., assignors to Lockheed Aircraft Corporation, Burbank, Calif.
No Drawing. Filed Nov. 28, 1967, Ser. No. 686,311
Int. Cl. C22c *1/08, 1/10;* B22f *1/00*
U.S. Cl. 75—206                    14 Claims

ABSTRACT OF THE DISCLOSURE

A method for making porous sintered materials from flake-shaped particles of the desired base metal. The resultant materials are charactereized in having uniform, interconnected pore channels controllable to average pore diameter sizes significantly less than one micron and useful as fluid flow distributors, filters and the like.

Each flake-shaped particle is coated with a hydrated gel which during subsequent processing decomposes to corresponding inert oxide dispersoid particles forming with the sintered metal particles a wetting angle of at least 90° as measured from the sintered metal-oxide particle interface to the sintered metal-atmosphere interface. Soluble salts, if any, are removed by means of a water wash from the coating and preferably the coating is then washed with the acetone to substantially preclude agglomeration between the metal particles during subsequent processing. Depending on the amount of corresponding oxide in the hydrated gel coating, the coated particles are either (a) pressed into a green compact which is subjected to a two stage heat treatment to decompose the gel coating to the corresponding oxide coating and to form the final sintered body, or, alternatively (b) subjected to a two stage heat treatment to decompose the gel coating to the corresponding oxide coating and to anneal the metal particles; the heat treated particles are then pressed into a green compact and sintered to form the final body. In one embodiment of the invention magnesia is chemically leached from the formed sintered material to maximize permeability of the material to fluid flow.

CROSS REFERENCES TO RELATED APPLICATIONS

This application more particularly describes and claims a method disclosed but not claimed in co-pending U.S. patent application Ser. No. 649,789 filed June 19, 1967, now Patent No. 3,397,968, for producing porous sintered materials.

BACKGROUND OF THE INVENTION

The aforementioned co-pending patent application discloses and claims a porous sintered material having a dispersed phase of inert particles distributed throughout a continuous framework of sintered metal particles and on the surfaces of pore channels defined by the sintered metal particles. The inert particles form with the sintered metal particles a wetting angle of at least 90° as measured from the sintered metal-inert particle interface to the sintered metal-atmosphere interface. The material exhibits a network of stabilized, interconnected pore channels of narrow size distribution with the pore channels being controllable to average pore diameters significantly less than one micron.

A variety of processes are detailed in the co-pending application for making such sintered materials. Such processes all have in common the steps of forming an initial mixture of metal particles and inert dispersoid particles, compacting the mixture to form a green compact and sintering the green compact to form the final porous sintered material.

As described in the aforementioned co-pending patent application, metal particles of any shape can be used as starting materials in the initial mixture provided the voids left between the particles after compaction to the green compact form interconnected pore channels penetrating the body of the compact. Significantly, flaky particles, that is, thin, flat, elongated or round platelets wherein one dimension is considerably less than the other two (the smallest dimension, particularly in stainless steel flake, may be considerably less than one micron) have not to applicants' knowledge been utilized heretofore in processes involving a powder compaction step, with the exception of aluminum flakes which are hot pressed. Commercial use of metallic flake particles has been limited to their being incorporated into surface coatings. One difficulty is that metallic flake particles have usually been extremely work-hardened or otherwise severely strained during their production and have a tendency to elastically spring back when pressed in a die so that satisfactory bodies of adequate green strength cannot be obtained from such particles as they are commercially available. Although such strains can be relieved by thermal annealing (U.S. Patent 2,354,727), the required high temperatures tend to sinter the particles together into agglomerates that become very difficult to work because they no longer constitute a free-flowing powder and do not retain their original particle size distribution.

As further discussed in the aforementioned co-pending patent application, it is necessary that the initial powder mixture should be such as to ensure uniform distribution of the inert particles at the surfaces of the metal particles during formation of the green compact. This necessitates the formation of a uniform mixture wherein the inert particles are located at or on the surfaces of the metal particles. No significant separation of the phase should occur causing some metal particles to be devoid of or have less inert particles on their surface than other metal particles. Although as noted, the process disclosed in U.S. Patent 3,175,904 has been utilized in forming such initial powder mixtures, it does have several drawbacks. Metal particles are coated by this process with an alcohol soluble salt of the desired inert particles by allowing the solvent containing the salt to evaporate from the metal particles. Even with vigorous agitation, evaporation of the solution proceeds from nucleated sites at the evaporating surfaces of the metal particles and inherently forms areas rich in the salt at these points while other areas on the surfaces are consequently deficient in salt. Additionally, the high temperatures required for decomposition of the salt to the oxide make this method applicable to only the noble and the easily reducible metals and not to the more reactive ones such as chromium containing alloys.

SUMMARY OF THE INVENTION

Briefly, in accordance with the invention, there is described a process for making porous sintered materials having the characteristics and properties set forth in co-pending U.S. patent application Ser. No. 649,789. The process utilizes metal flake particles as the starting material in forming the initial mixture. The advantage of using flake particles is that a small web dimension in the order of microns or less is obtained without the use of ultrafine pyrophoric powders which are difficult, expensive and dangerous to process. Further, large cells of the idealized structure are obtained by wrinkling of the flakes which during subsequent sintering produces joining between neighboring particles mainly at the edges and at the peaks of the major asperities resulting in minimum volume shrinkage and a more open permeable structure for the same density and strength. The use of flake particles permits the obtaining of minimum diameters of the pores and further the obtaining of sintered materials of extremely thin cross sections exhibiting excellent ductility and strength. The aforementioned difficulties in processing flake particles are overcome by the process of the invention and an initial mixture formed consisting of free-flowing powder with practically the same particle size distribution as in the original powder. Additionally, the process overcomes the problems associated with the aforementioned process of U.S. Patent 3,175,904 and results in a homogenous initial mixture of metal powders and inert oxides. The process further obviates the limitation of Patent 3,175,904 and permits the processing of reactive metals.

More particularly, by the methods of the invention, the desired flake-shaped metal particles for example stainless steel, Hastalloy B, nickel-chromium alloys and refractory metals such as tungsten are coated by mechanical means or chemical precipitation with a hydrated gel which during subsequent processing decomposes to corresponding inert oxide dispersoid particles such as magnesia, zirconia and alumina which forms with the sintered metal particles a setting angle of at least 90° as measured from the sintered metal-oxide particle interface to the sintered metal-atmosphere interface. Soluble salts, if any, are removed by means of a water wash from the coating and preferably the coating is then washed with acetone to substantially preclude agglomeration between the metal particles during subsequent processing. Depending on the amount of corresponding oxide in the hydrated gel coating, the coated particles are either (a) pressed into a green compact which is subjected to a two stage heat treatment involving a first heating below sintering temperature to decompose the gel coating to the corresponding oxide coating followed by a second heating at sintering temperature to form the final sintered body, or (b) subjected to a two stage heat treatment below sintering temperature involving a first heating to decompose the gel coating to the corresponding oxide coating at temperatures lower than the oxidation temperature of the metal particles followed by a second heating at the annealing temperature for the metal particles; the heat treated particles are then pressed into a green compact and sintered to form the final body. In one embodiment of the invention magnesia is chemically leached from the formed sintered material to maximize permeability of the material to fluid flow.

DESCRIPTION OF THE PREFERRED EMBODIMENTS

As the starting material in the process of the invention, flake-shaped particles of the desired metal are utilized, it being understood that the term "metal" as used herein encompasses both metal and metal alloy systems. Commensurate with the aforesaid co-pending patent application, any metals utilized by the art to form sintered bodies are generally effective as materials in the instant process. As a limiting factor, the use of certain metals is dependent upon the development of metallurgical techniques for their manufacture in flake form. Commercially available flake-shaped particles currently available in the art include, for example, stainless steel, Hastealloy B, nickel-chromium alloys (usually of the austenitic type and containing additions of aluminum, titanium and a refractory metal of the group niobium, tantalum, molybdenum and tungsten which strengthen the nickel-chromium matrix by forming in it fine precipitates of intermetallic compounds) and refractory metals such as tungsten.

The flake-shaped particles are then coated with a hydroxide gel, either directly by mechanical mixing or by precipitation of the gel complex from a salt solution followed by washing in a suitable solvent such as water to remove the salt ions from the complex. For purposes of illustration, Milk of Magnesia, a salt-free gelatinous suspension of magnesium hydroxide may be mechanically mixed with the metal flakes to directly coat the flake with gel. Alternatively, magnesium nitrate hexahydrate, $$Mg(NO_3)_2 \cdot 6H_2)$$

is dissolved in ethyl alcohol, mixed with the metal flakes, reacted with the precipitation agent ammonium hydroxide to form on the flakes a salt-contaminated magnesium hydroxide gel which is then washed with water to remove ammonium nitrate. The precipitation agent generally is one containing hydroxyl ions, with ammonium hydroxide being preferred over for example, sodium and potassium hydroxide since the ammonium salt is easily removed by a water wash whereas the sodium and potassium ions are difficult to remove even by prolonged washing.

It has been determined as will be subsequently explained in greater detail, that the flake coating of the invention must be a gelatinous hydroxide or a gelatinous hydroxide complex which is salt free. The use of a hydroxide gel coating permits formation of green compacts from metallic flakes having the requisite green strength and precludes the formation of partially sintered agglomerates during annealing. It has further been found that for certain minimum gel coatings, the annealing step may be omitted and the metallic flakes directly pressed into a green compact which is then sintered to the final body. The use of a hydroxide coating, per se, is ineffectual in achieving the preceding objectives and advantages of the process of the invention.

It has been further determined that the presence of salt in the gel coating precludes the use of reactive metal flakes as starting materials due to the high decomposition temperatures required for the salts and the evolution of oxidizing gases during transformation of the salt to the oxide. The gel coating should preferably be one that is free of residual contaminants, such as sulfur, chlorine, oxygen which may affect the chemical, physical and mechanical properties of the final body. The hydroxide gel must not attack but must uniformly attach itself to the metal flake by Van Der Waal and London forces, covalent, hydrogen or other types of bonding to form an adherent coating which is not affected during further processing and by mechanical handling. The gel, when heated in a reducing atmosphere, must decompose to the oxide at temperatures below the oxidation temperature of the metal which for reactive metals is generally below 900° C. and preferably below 600° C. Of the many possible hydroxide gels available, those of the alkaline-earth metals, with the exception of strontium whose hydroxide fuses in a hydrogen atmosphere, are the most preferred since they form the dispersoid oxide at the desired low temperatures and are readily available free of such residual contaminants.

A further listing and discussion of hydroxide gels is found in the following references:

(1) A. F. Wells, "Structural Inorganic Chemistry," 3rd ed., Oxford at the Clarendon Press (1962), pp. 540–564.
(2) John P. Hunt, "Metal Ions in Aqueous Solution" W. A. Benjamin, Inc., New York (1963).
(3) Omer K. Whipple, "Chemical Properties and Identification of Ions" Wadsworth Publishing Co., Inc., San Francisco (1961).
(4) P. C. L. Thorne & E. R. Roberts, "Inorganic Chemistry" by F. Ephraim.
(5) N. V. Sidgwick, "Chemical Elements and Their Compounds," vol. 1, Oxford, The Clarendon Press (1950), p. 235.
(6) J. Hall, "A Comprehensive Review of the Aqueous Chemistry of Zirconium and Hafnium" Nuclear Research Institute Czechoslovak Academy of Sciences, Kveten, Prague 1964 (Available from TAM Division National Lead Company, 111 Broadway, New York, N.Y. 10006.
(7) I. I. Chernyaev, Editor, "Complex Compounds of Uranium" chapters 4 and 11. Academy of Sciences of the U.S.S.R. Translated from the Russian, L. Mandel and edited by M. Govreen. Published by the Israel Program for Scientific Translation (1966).

The hydroxide gel must be convertible to its corresponding oxide having the characteristics set forth in the aforementioned application; that is, an oxide having the heretofore defined wetting angle of at least 90°. Table 1 of the application sets forth some of the many permissible metal-dispersoid oxide phase systems.

Pore size in materials made by the invention is adjusted in accordance with the teachings of the aforementioned patent application with the preferred technique being to adjust the volume fraction of oxide used in a given batch of starting material. The volume fraction of oxide is directly dependent upon the amount of hydroxide gel used to coat the metal flakes. As taught in the application, pore sizes up to about 25 microns can be controlled by varying the oxide dispersoid volume fraction from about 0.001 (0.1 percent by volume) to about 0.20 (20 percent by volume). Within these limits the amount of dispersoid particles distributed on the surfaces of the interconnected pore channels is sufficient to stabilize the channels but less than the number which would cause blockage of the channels. As the dispersoid concentration is increased the pore sizes are decreased. Typically these limits are also applicable in the process of the invention to produce upon further processing the desired microstructure in the formed body; that is, one wherein at least 70 percent of the pore channels are interconnected with the pore channels having diameters from substantially less than one micron to about 25 microns and wherein the density of the material is from about 30 percent to about 90 percent of the theoretical density. However, as previously discussed, the sintering of flake particles, as opposed to other shaped particles, results in smaller volume shrinkage and a more open, permeable structure for the same density and strength. Accordingly, for certain flake-shaped metals amounts of oxide dispersoid in excess of 20 percent can be tolerated without blockage of the channels and without altering the microstructure of the formed material. Illustrative of the foregoing, 20 volume percent dispersoid is the maximum limit for stainless steel coated with magnesia, alumina and zirconia. However, magnesia coated tungsten flake particles can tolerate over 50 percent by volume dispersoid concentration and still exhibit the aforementioned microstructure. In view of the teachings contained herein and further in view of the teachings of the aforementioned patent application which is incorporated herein by reference, it is considered within the skill of the art to adjust dispersoid concentration to achieve porous materials having the required microstructure. Commensurate with the referenced application, the size of the metal flake particle typically varies in size up to about 150 microns for pore sizes up to 25 microns.

Following formation of the hydroxide gel coating on flake particles, the coated particles are preferably washed with acetone to substantially preclude agglomeration between the particles during subsequent processing. Depending on the amount of gel coating and therefore the volume of corresponding oxide in the gel coating taken on a dry basis of the oxide-metal flake mixture, the coated particles may be processed several ways.

For intermediate and high oxide concentrations, for example, 2% by volume magnesia or zirconia and higher, the flakes may be directly compacted to the green compact without annealing since the gel coating acts as a binder and permits compaction without lamination formation. The green compact then undergoes a two stage heat treatment in a reducing atmosphere. The first heat treatment is conducted at a temperature below the oxidizing temperature and is sufficient to decompose the gel coating to the oxide in form of a dispersoid and remove essentially all water from the coating. Such heating is typically conducted between 350° C. and 900° C. The second heating is conducted at the temperature at least sufficient to promote sintering between the metal particles, up to temperatures 0.9 the absolute melting point of the metal particles for a time sufficient to result in a sintered material having a density from about 30 percent to 90 percent theoretical density. Such temperatures are typically above 900° C. and generally at least 1200° C. or higher.

For intermediate and low oxide concentrations, for example, less than 5 percent by volume magnesia or zirconia, the coated particles are subjected to a two stage heat treatment in a reducing atmosphere. The first heating is utilized to decompose the gel coating to the oxide and remove essentially all water from the coating, the heating being conducted in accordance with the above specified conditions. The second heating involves sufficiently annealing the metal particles so as to remove enough strain to permit their subsequent compaction without lamination formation. The oxide coating resulting from the first heat treatment acts to prevent particle agglomeration during such annealing, and further by virtue of acting as a binder during compaction permits the use of annealing temperatures less rigorous then those required to fully stress relieve the metal particles. A typical annealing temperature is 1000° C. The heat treated particles are then compacted at pressures below lamination formation and sintered to the final body having the before mentioned characteristics. It has been found that in the case of magnesia and zirconia this alternative process cannot be utilized when the oxide concentration is 5 percent by volume or higher since the oxide layer at such high concentrations loses its attributes as a binder and crumbles during compaction. It has been further discovered that this alternative process must be utilized in preference to the first above described process when the magnesia or zirconia oxide concentration is less then two percent since there is not enough oxide in this instance to act as a binder during compaction and laminations are accordingly formed in the green compact when the initial mixture is directly compacted to the green compact without annealing in accordance with the first process set forth above.

The above temperatures and oxide concentrations are considered to be illustrative only with the particular process to be utilized being dependent on the particular dispersoid flake combination and, as such, is readily ascertainable by those skilled in the art by routine experimention. For example, the formation of laminations in the green compaction is readily detected visually and accordingly the particular oxide concentration at which this occurs is not critical to the practice of the process.

The compaction and sintering steps described above are conducted in accordance with the aforementioned patent application. As discussed therein, the pore size of channels in the finished product is influenced not only by the concentrations and sizes of metal and dispersoid particles, but also by the degree of compaction experienced in forming the green compact and the sintering conditions.

The green compact may be formed by any of the various state-of-the-art techniques, including, for example, uni- or multi-directional die pressing, isostatic pressing, powder rolling, extruding and the like. Various degrees of compaction are achieved in these processes resulting in a variety of pore sizes in the green compact. As such, pore size and density of the green body must be determined as a function of the degree of compaction. Curves of the type shown in FIGURE 4 of the aforementioned application are readily determinable for the initial mixtures of the invention, which curves are then related to the microstructure of the formed body in order to obtain the microstructure of the green compact required to produce the desired finished miscrostructure.

The transition between the initial green compact microstructure and the final microstructure occurs under the influence of the sintering environment. The temperature has a significant influence on the final microstructure. After a short initial period, sintering time has little effect on the final microstructure. It has been found that when the green compact is sintered at constant temperature the compact undergoes a relatively rapid densification that is, shrinkage, during approximately the first two hours of heating. In this period of time the smallest pores shrink and close and the dispersoid particles grow until equilibrium with the sintering temperature is achieved. Further heating causes only minor densification. The actual rates of the initial and final densification depend, of course, on the nature and composition of the green compact.

Commenserate with the aforementioned patent application, to realize the wide range of pore size density combinations permissible in a given metal-dispersoid system of the invention, it is desirable to initially prepare several powder batches each containing differing amounts and sizes of dispersoid. Each batch of powder is then characterized as to its sintering behavior as a function of the compacting pressure and sintering conditions to determine changes in pore size and density. In general the sintering time should not be shorter than about one hour and preferably is at least two hours to achieve the proper degree of pore stabilization in the structure.

The compacting pressures are varied over a range starting with the lowest pressure resulting in a coherent green body up to the highest pressure short of causing laminations or other defects in the sample. The sintering temperatures vary from about 0.5 to 0.9 of the melting point in degrees Kelvin of the chosen metal. A temperature within this range is generally applied in the art for sintering metal powders because only at temperatures above 0.45 of the absolute melting point of the powder will the material transport processes responsible for bonding together the adjacent particles in the compact become fast enough for practical commercial operation. Density and pore size are determined on both the as-compacted green bodies and the sintered samples. The density is determined by measuring the volume and weight of the samples while pore sizes are determined from measurements such as lineal analysis on polished metallographic cross sections or from bubble point or mercury intrusion methods. The resulting data serves as a basis for plotting diagrams of pore size versus density for each sintering temperature as illustrated by FIGURE 6 of the aforementioned application. Appropriate diagrams are then constructed relating green density to sintered density and pore size at various sintering temperatures, as illustrated by FIGURE 7 of the aforementioned application. Based on the preceding and as more fully described in the aforementioned application, a finished body is readily produced having any given stabilized pore size and density combination within the limits of the invention.

In accordance with the invention it has been further discovered that magnesium oxide can be removed from the final sintered body by chemical leaching while still retaining a microstructure wherein at least 70 percent of the pore channels are interconnected. Such magnesia removal has been found to significantly enhance fluid flow permeability and is accordingly advantageous in those instances where high temperature stability is not required. It is to be understood that while it may be desirable to remove magnesia in certain instances, the use of magnesia is a prerequisite to the formation of the final sintered body having the microstructure specified herein.

Specific examples of procedures used in the process of the invention are given below, it being understood these examples are to be construed as illustrative only and not as limiting in any manner the scope and spirit of the invention as defined by the appended claims.

EXAMPLE 1

A microporous type 316 stainless steel tube was produced having particular utility as a fluid metering device for printing, duplicating and copying machines wherein a fluid is applied uniformly and continuously by capillary action to moving paper by a rolling action. The tube is characterized by moderate water flow rate, good formability and high temperature pore stability in dry (−65° F. dew-point) hydrogen to 1200° C. and in air to 550° C.

The weight of the stainless steel tube approximated 190 grams and was produced from powder made as follows.

146.3 grams of magnesium nitrate hexahydrate was dissolved in 3 liters of commercial denatured ethyl alcohol. Twenty-three hundred grams of −325-mesh flake-shaped type 316 stainless steel powder, Grade 756, sold by Alcan Metal Powder Co., Elizabeth, N.J., were then added to the solution. The powder was thoroughly dispersed by vigorous mixing for 30 minutes. Investment of the metal powder with magnesium hydroxide was carried out by the addition of 28 percent ammonium hydroxide solution until the pH of the slurry was raised to 14. This required 1.5 liters of the ammonium hydroxide solution. Mixing was continued for another 15 minutes and then the slurry was filtered through a vacuum filter. The filter cake was washed with about 2 liters of denatured ethyl alcohol. The denatured alcohol wash was followed by an acetone wash to remove the free alcohol present. The acetone-washed filter cake was allowed to air-dry until it became a free-flowing powder again. The air-dried powder was sieved through a 48-mesh screen.

The magnesium hydroxide invested powder was loaded into nickel trays to a depth of less than one inch. The loaded trays were placed into an electrically heated Inconel tube furnace and exposed to a continuous stream of dry hydrogen, heated to 900° C. and maintained at this temperature for three hours to dehydrate and calcine the magnesium hydroxide adhering onto each particle to magnesium oxide and allow the hydrogen stream to remove the water formed during the decomposition. At the end of three hours, the temperature was raised to 1000° C. and kept there for one hour and the furnace then allowed to cool to room temperature. After cooling hydrogen was stopped and the tube filled with nitrogen. The heat treated powder was removed and found to be 100 percent less than 100-mesh.

The resulting stainless steel powder containing one percent by weight magnesium oxide was isostatically compacted in rubber tooling. After ejection from the tooling, the compacted tubes were sintered in dry hydrogen of −65° F. dew-point, at 1225° C. for two hours. After facing the ends, the sintered tubes were 11 inches long. The average pore size was determined by the E128–61 ASTM test. The water flow rate was obtained through the walls of the tube at a differential pressure equivalent to 6 inches of water. The results obtained were the following:

TABLE 1

| Sample | Compaction pressure, tons per sq. inch | Outside diameter, mm. | Wall thickness, mm. | Average pore size, microns | Water flow, ml./min. |
|---|---|---|---|---|---|
| 1 | 3 | 47.1 | 1.05 | 5.0 | 248 |
| 2 | 5 | 46.6 | 1.15 | 4.9 | 85 |
| 3 | 10 | 46.4 | 1.05 | 3.9 | 22.5 |
| 4 | 15 | 46.1 | 1.25 | 3.4 | 25.0 |

The tubes were placed in an ultrasonic agitated water solution containing 5% nitric acid by volume. After four hours, the tubes were ultrasonically rinsed in distilled water, followed by an ultrasonic rinse in acetone. The average pore size was determined by the E128–61 ASTM test. The water flow rate was obtained through the walls of the tube at a differential pressure equivalent to 6 inches of water. The results obtained were the following:

TABLE 2

| Sample | Average pore size | Water flow, ml. per min. | Percent theoretical density |
|---|---|---|---|
| 1 | 8.7 | 562 | 56.8 |
| 2 | 5.81 | 110 | 59.1 |
| 3 | 4.21 | 69 | 60.1 |
| 4 | 3.61 | 25 | 59.0 |

The microporous tube of "Sample 2" was machine ground to a smooth finish. The machined tube was placed in a phosphoric acid solution containing 85% $H_3PO_4$ which was heated to 80° C. The electropolishing was carried out for 10 minutes at 30 amperes with a voltage drop of 4 volts, followed by another 10 minutes at 50 amperes and voltage drop of 7 volts. The electropolished tube was ultrasonically cleaned in three operations; water, 20% hydrochloric acid solution, and water again. The cleaned tube was used for the distribution of Bruning 3000 Developer No. 32–375 made by Charles F. Bruning Company, Division of Addressograph Multigraph Corporation of Mount Prospect, Ill.

EXAMPLE 2

A microporous type 316 stainless steel filter was produced. The filter was characterized by high brightness, high formability, high flow rate and an average pore size of 0.6 to 2. microns and has particular utility as a microbiological filter material. This filter was produced according to the following procedure.

In 2.0 liters of denatured ethyl alcohol were dissolved 985 grams of magnesium nitrate hexahydrate. Five kilograms of —325-mesh flake-shaped type 316 stainless steel powder grade 756 sold by Alcan Metal Powder Co., Elizabeth, N.J., were then added to the solution. The powder was thoroughly dispersed by vigorous mixing for 30 minutes. Investment of the metal powder with magnesium hydroxide was carried out by the addition of 28 percent ammonium hydroxide solution until the pH of the slurry was raised to 14. This required 1 gallon of the ammonium hydroxide solution. Mixing was continued for another 15 minutes. The slurry was then filtered through a vacuum filter and the filter cake washed with about 2 liters of denatured alcohol. The washed filter cake was air-dried and sieved through a 48-mesh screen.

A portion of the magnesium hydroxide invested powder containing 5% by weight magnesium oxide, was loaded into a double acting die set with a 2.75 inch diameter cavity and compacted into discs. The discs were then sintered in hydrogen at approximately —40° C. dew-point. The furnace temperature was raised at a rate of 600° C. per hour, up to 900° C. The furnace was maintained at 900° C. for 3 hours after which the temperature was raised to 1225° C., at the rate of about 80° C., per hour. The furnace was maintained for 2 hours at 1225° C. Throughout the heating and sintering operations sufficient hydrogen flow was maintained to keep the partial pressure of water in the furnace very low so that no oxidation of chromium would occur. The sintered discs were cut to 47 mm. diameter, their pore size determined by the E128–61 ASTM test, and water flow was also determined, the results are the following:

TABLE 3

| Disc No. | Compaction pressure, tons per sq. inch | Thickness, mm. | Pore size in microns | | Water flow at 10 p.s.i., ml. per min. |
|---|---|---|---|---|---|
| | | | Maximum | Average | |
| 96-3 | 5 | .20 | 1.6 | 0.8 | 60.4 |
| 96-13 | 10 | .32 | 1.0 | 0.6 | 16 |

The magnesium oxide coating was ultrasonically leached from the discs in a solution containing 5% nitric acid by volume in distilled water. The discs were then rinsed in distilled water, followed by a rinse in acetone. The average pore size was determined by the E128–61 ASTM test. The water flow rate was obtained through the discs and the results were the following:

TABLE 4

| Disc No. | Compaction pressure, tons per sq. inch | Weight loss, percent | Pore size in microns | | Water flow at 10 p.s.i., ml. per min. |
|---|---|---|---|---|---|
| | | | Maximum | Average | |
| 96-3 | 5 | 4.34 | 2.0 | 0.9 | 156 |
| 96-13 | 10 | 4.86 | 1.1 | 0.75 | 72.4 |

Another portion of the magnesium hydroxide invested powder was placed into nickel trays which were loaded into an Inconel tube furnace and exposed to a continuous stream of dry hydrogen. The powder was then heated to 900° C., and maintained at temperature for 3 hours to dehydrate and calcine the magnesium hydroxide coating each particle to magnesium oxide and allow the hydrogen stream to remove the water formed during the decomposition. At the end of the heat cycle, the furnace was allowed to cool to room temperature. The heat treated powder, screened through a 100-mesh screen, was loaded into a double acting die set with a 2.75 inch diameter cavity and compacted into discs. The discs were then sintered in hydrogen of approximately —65° C. dew-point, for 2 hours at 1225° C. The discs were cut to 47 mm. in diameter and tested as described above. The results of the tests were the following:

TABLE 5

| Disc No. | Compaction pressure, tons per sq. inch | Thickness, mm. | Pore size in microns | | Water flow at 10 p.s.i., ml. per min. |
|---|---|---|---|---|---|
| | | | Maximum | Average | |
| 95-1 | 5 | 0.35 | 2.0 | 1.0 | 180 |
| 95-11 | 10 | 0.48 | 0.8 | 0.6 | 24 |

The 47 mm. discs were placed in an ultrasonically agitated 5% nitric acid solution to dissolve out the magnesia coating. At the end of the leaching operation the discs were washed in water, and then rinsed in acetone. The leached discs were tested as described above. The results obtained were the following:

TABLE 6

| Disc No. | Compaction pressure, tons per sq. inch | Weight loss, percent | Pore size in microns | | Water flow at 10 p.s.i., ml. per min. |
|---|---|---|---|---|---|
| | | | Maximum | Average | |
| 95-1 | 5 | 4.25 | 2.5 | 1.9 | 204 |
| 95-11 | 10 | 3.80 | 1.0 | 0.75 | 96 |

Three of the above nitric acid leached discs were tested as microbiological filter material.

Cultures of the viable wine yeast and bacteria, were diluted in buffer solutions to a cell concentration of $1 \times 10^4$ cells per ml. The test equipment was sterilized by pumping a solution of 1000 mg. per liter of sulfur dioxide through and rinsing out with sterile water. A one liter of test solution containing about $10^7$ cells of the test organism was placed in the sterilized test equipment and pumped through the disc being tested. In series with the disc undergoing testing was a Millipore 0.45 micron porous filter. This Millipore disc was used as a trap filter and removed after the run, placed on the proper medium to check for cells getting past the stainless steel filter. The results obtained are included in the table below.

TABLE 7

| Disc No. | Pore size, micron | | Retained on microporous stainless steel filter | |
|---|---|---|---|---|
| | Maximum | Average | Bacteria Globigii spores, 0.7 x 1.5 microns | Bacteria *Lactobacillus delbrueckii*, 0.7 x 2.0 microns |
| 95-1 | 2.5 | 1.5 | Yes | |
| 95-11 | 1.0 | 0.75 | | Yes. |
| 96-3 | 2.0 | 0.9 | Yes | |

EXAMPLE 3

A microporous type 316 stainless steel filter was produced. The filter was characterized by high brightness, high formability, high flow rate and an average pore size in the range of 3 to 5 microns for use in the beverage industry. This filter was produced according to the following procedure:

In 6.5 liters of denatured ethyl alcohol were dissolved 985 grams of magnesium nitrate hexahydrate. Five kilograms of —325-mesh flake shaped type 316 stainless steel powder grade 756 sold by Alcan Metal Powder Co., Elizabeth, N.J., were then added to the solution. The powder was thoroughly dispersed by vigorous mixing for 30 minutes. Investment of the metal powder with magnesium hydroxide was carried out by the addition of 28 percent ammonium hydroxide solution until the pH of the slurry was raised to 14. This required 8.3 liters of the ammonium hydroxide solution. Mixing was continued for another 15 minutes and then the slurry was filtered through a vacuum filter. The filter cake was washed with about 2 liters of denatured alcohol. The denatured ethyl alcohol wash was followed by an acetone wash to remove the free alcohol present. The acetone washed filter cake was allowed to air-dry until the powder was again free flowing. The air-dried powder was sieved through a 48-mesh screen to be sure that there were no aggregate formed.

A portion of the magnesium hydroxide invested powder containing 3% by weight magnesium oxide, was loaded into a double acting die set with a 2.75 inch diameter cavity and compacted into discs at 5 tons per square inch pressure.

The discs were then sintered in hydrogen at approximately —40° C. dew-point. The furnace temperature was raised at a rate of 600° C. per hour, up to 900° C. The furnace was maintained at 900° C. for 3 hours and then the temperature was raised to 1225° C., at the rate of about 80° C., per hour. The furnace was maintained for 2 hours at 1225° C. Throughout the heating and sintering operations sufficient hydrogen flow was maintained to keep the partial pressure of water in the furnace very low so that no oxidation of chromium would occur. One sintered disc had a largest pore size of 5.11 microns and an average pore size of 4 microns. This 47 mm. disc was placed in an ultrasonic sink, covered with a 5% solution of nitric acid and kept under ultrasonic agitation for 4 hours. At the end of the leaching operation the disc was washed in water, and then rinsed in acetone. The loss in weight during the leaching operation was 2.86%. The leached disc had a largest pore size of 6.1 microns and an average pore size of 4.9 microns. Water flow rate through the disc at 10 pounds per square inch differential pressure was 338 ml./min.-in.$^2$.

Another portion of the magnesium hydroxide invested powder was placed into nickel trays which were loaded into an Inconel tube furnace and exposed to a continuous stream of dry hydrogen. The powder was then heated to 900° C., and maintained at temparture for 3 hours. At the end of the heat cycle, the furnace was allowed to cool to room temperature. The heat treated powder, screened through a 100-mesh screen was loaded into a double acting dye set with a 2.75 inch diameter cavity and compacted into discs at 5 tons per square inch pressure. The discs were then sintered in hydrogen of approximately —40° C. dew point, for 2 hours at 1225° C. One sintered disc had the largest pore size of 4.9 microns and an average pore size of 3.1 microns. This 47 mm. disc was placed in an ultrasonic sink, covered with a 5% nitric acid solution, and kept under ultrasonic agitation for 4 hours. At the end of the leaching operation the disc was ultrasonically cleaned in water, and rinsed in acetone. The loss in weight during the leaching operation was 2.75%. The leached disc had the largest pore size of 5.25 microns and an average pore diameter of 3.1 microns. Water flow rate through the disc at 10 pounds per square inch differential pressure was 137 ml./min-in$^2$.

EXAMPLE 4

A microporous type 316 stainless steel disc was produced. The disc was characterized by high brightness, high formability, high flow rate and an average pore size in the range of 2 to 5 microns. The formability was evidenced by a bending angle of 180 degrees over a mandrel of a radius corresponding to 10 times the sheet thickness. This disc was produced according to the following procedures.

In 1304 milliliters of denatured ethyl alcohol were dissolved 130 grams of magnesium nitrate hexahydrate. A batch of 1,000 grams of flaked shaped stainless steel powder Type 316, Alcan Metal Powder Company Grade 756 was dispersed in the solution, allowed to mix for about 30 minutes, and then invested with magnesium hydroxide by the addition of 28% ammonium hydroxide solution until the pH of the slurry was raised to about 14. Mixing was continued for another 15 minutes, then the slurry was filtered through a vacuum filter. The filter cake was washed with 2000 milliliters of denatured ethyl alcohol. The denatured ethyl alcohol wash was followed by acetone wash. The acetone-washed filter cake was allowed to air dry and then sieved through a 48-mesh screen.

The magnesia-invested powder was either used in the as-coated state or heat treated, placed into nickel trays which were loaded into the Inconel tube furnace and heat treated in the same way as described in Example 3 with the exception that the final annealing temperature was about 1000° C.

The powder containing 2 percent magnesium oxide was loaded into a double acting die set with a 2.75 inch diameter cavity and compacted at five tons per square inch to a thickness of 0.25 millimeter and a pore volume of 62.3 percent. The disc was then sintered in hydrogen of approximately —65° F. dewpoint for two hours at 1225° C. The sintered disc had a pore volume of 32.2 percent, a largest pore size of 5 microns and an average pore size of 4.25 microns. Water flow rate through the disc at 10 p.s.i. differential pressure was 237 ml./min.-in.$^2$.

EXAMPLE 5

A microporous type 316 stainless steel foil was produced by powder rolling for use as a high flow rate filter medium. The microporous stainless steel used for this medium is characterized by superior formability as compared to mechanically or isostatically compacted parts. The stainless steel foil weighed approximately 10.5 grams and was made from the same stainless steel flake powder containing two percent by weight magnesium oxide used for the preparation of the porous tube of Example 1. The powder was rolled in the following manner:

(a) The mill rolls were set in a closed position under pressure;
(b) The powder is screened onto a paper sheet base 6 inches wide by 9 inches long to a depth of 0.03 inch;
(c) The powder was covered with paper so as to produce a sandwich;
(d) The sandwich was fed into an 8 inch wide rolling mill at a roll speed of less than 3 feet per minute; the rolled-compacted foil was approximately 0.005 inch thick.

The paper on the foil was then peeled away and the rolled powder foil sintered in —40° C. dewpoint hydrogen for two hours at 1225° C. The sintered foil, after trimming, was 4 inches wide by 7 inches long by 0.004 inch thick. The foil had a pore volume of 28.8 percent and an average pore size of 1.75 microns according to ASTM E128–61. The water flow rate through the foil at 30 p.s.i. differential pressure was 418 ml./min.-in.$^2$.

EXAMPLE 6

A microporous type 316 stainless steel disc, 47 mm. in diameter, and 0.013 inch thick was produced for use as a fluid filtration unit. The microporous stainless steel used for this device is characterized by a high flow rate, very uniform pore size and high temperature pore and dimensional stability to 1200° C. in —40° C. dewpoint hydrogen and to 550° C. in air. The disc weighed approximately 2.5 grams and was produced from powder prepared as follows.

To two liters of distilled water were added 6 drops of alkyl phenoxy poly-ethoxy ethanol sold by Rohm and Haas, Philadelphia, Pa., under the name Triton X–100 and in this solution were dissolved 2020 grams of aluminum nitrate. To the resulting solution were added 2500 grams of −325 mesh flake-shaped type 316 stainless steel powder Grade 756 sold by Alcan Metal Powder Company, Elizabeth, N.J. The paste-like mixture was thinned out by the addition of one liter of distilled water. The pH of the slurry was 0.5 and the temperature 80° C. After mixing for 15 minutes, investment of the metal powder with hydrated aluminum oxide was carried out by the addition of 28 percent ammonium hydroxide solution. After 980 ml. of ammonium hydroxide had been added, the slurry became paste-like; therefore, two liters of distilled water were added. To the thinned slurry were added 120 ml. of ammonium hydroxide and again the slurry became quite pastey; therefore, one more liter of distilled water was added. The addition of 28 percent ammonium hydroxide was continued until the pH was increased to 7.3. One more liter of distilled water was added and the mixing was continued for another 15 minutes. This slurry was filtered through a vacuum filter. The filter cake was then washed with distilled water until the filtrate had a pH of 7. The water wash was followed by an acetone wash. The acetone-washed filter cake as air dried, and then sieved through a 48-mesh screen. The hydrated-alumina-invested powder was loaded into nickel trays, placed into an Inconel tube furnace and heat treated in hydrogen in the same way as previously described in Example 1.

The stainless steel powder containing ten weight percent aluminum oxide was loaded into a standard double acting die with a 2.75 inch diameter cavity. Discs were mechanically pressed at several compaction pressures with the following results:

TABLE 8

| Disc No. | Compaction pressure, t.s.i. | Diameter, mm. | Thickness, mm. | Percent pore volume |
| --- | --- | --- | --- | --- |
| 11027-76-1 | 2 | 69.85 | 0.39 | 72 |
| 11027-75-4 | 5 | 69.85 | 0.33 | 71 |
| 11027-77-9 | 10 | 69.85 | 0.33 | 64.8 |
| 11027-78-4 | 15 | 69.85 | 0.35 | 58.1 |

The discs were then sintered in hydrogen of approximately −40° C. dewpoint for 2 hours at 1225° C. The properties of the sintered disc are summarized as follows:

TABLE 9

| Disc No. | Thickness, inches | Average pore size, microns | Largest pore size, microns | Percent pore volume |
| --- | --- | --- | --- | --- |
| 11027-76-1 | 0.018 | 3.5 | 5.0 | 61.4 |
| 11027-75-4 | 0.013 | 2.25 | 3.25 | 57.3 |
| 11027-77-9 | 0.013 | 1.4 | 1.75 | 44.7 |
| 11027-78-4 | 0.014 | 1.25 | 1.6 | 43.6 |

Pore size was measured according to ASTM Standard E128–61. All discs were punched to the final size of 47 mm. Water flow rate through the discs at 30 p.s.i. differential pressure ranged from 34.5 ml./min.-in.$^2$ at 1.25 micron average pore size to 336 ml./min.-in.$^2$ at 3.5 micron average pore size.

EXAMPLE 7

Microporous type 304 stainless steel discs were produced for use as fluid filtration units. The discs produced, as described below, are characterized by very uniform pore size distribution and high temperature pore and dimensional stability to 1200° C. in −40° C. dewpoint hydrogen and in air to 550° C. The stainless steel discs were produced from powder prepared as follows:

In 3 liters of distilled water were dissolved 96.2 grams of zirconyl nitrate. To the above solution were added 2270 grams of −325 mesh flake-shaped type 304 stainless steel powder, purchased from Chas. Pfizer & Co., Inc., Minerals, Pigments and Metals Division, under the name of Stay Steel (RX–2063). After mixing for about 30 minutes, investment of the metal powder with dihydrated zirconyl diammino nitrate complex was carried out by the addition of 28% ammonium hydroxide solution until the pH of the slurry was raised to about 8. This required 50 ml. of the above ammonia solution. Mixing was continued for another 15 minutes and then the slurry was filtered through a vacuum filter. The filter cake was washed with distilled water until the pH of the filtrate was lowered to 7. The washed filter cake was placed in the drying oven and dried at 110° C. and then sieved through a 48 mesh screen. The zirconyl-complex-invested powder was loaded into nickel trays which were placed into an Inconel tube furnace and heat treated in hydrogen in the same way as was done for the magnesia invested stainless steel powder described in Example No. 1, with the exception that the final annealing temperature was 1090° C. The stainless steel powder containing two weight percent-zirconium oxide was loaded into a standard double acting die with a 1.5 inch diameter cavity. Discs were mechanically pressed at several compaction pressures with the following results:

TABLE 10

| Disc No. | Compaction pressure, t.s.i. | Diameter, mm. | Thickness, mm. | Percent pore volume |
| --- | --- | --- | --- | --- |
| 11043-1-10 | 5 | 38.16 | 2.25 | 57.1 |
| 11043-1-12 | 15 | 38.16 | 1.80 | 45.4 |
| 11043-1-14 | 25 | 38.16 | 1.58 | 39.0 |

The discs were then sintered in hydrogen of approximately −40° C. dewpoint for two hours at 1225° C. The properties of the sintered discs are shown below:

TABLE 11

| Disc No. | Thickness, mm. | Average pore size | Largest pore size | Percent pore volume |
| --- | --- | --- | --- | --- |
| 11043-1-10 | 2.01 | 1.1 | 1.75 | 29.6 |
| 11043-1-12 | 1.64 | 0.4 | 0.75 | 21.7 |
| 11043-1-14 | 1.51 | 0.3 | 0.50 | 24.8 |

Pore sizes was measured according to ASTM Standard E128–61.

EXAMPLE 8

In 3.5 liters of distilled water were dissolved 83 grams of zirconyl nitrate and to the solution was added 2000 grams of flake shaped Hastalloy B powder particles (26% Ni—32% Mo—6% Fe) purchased from United States Bronze Powders, Inc., Flemington, N.J. Standard sieve analysis of this powder showed that 93 percent of the particles pass through 100 mesh screen, 86 percent through 200 mesh and 49 percent through 325 mesh screen. Mixing of the slurry was continued for about 15 minutes and then 28 percent ammonium hydroxide solution was slowly added until the pH of the slurry had increased to about 8 to precipitate a zirconyl-ammino complex on the surface of the metal particles. Mixing was continued for 30 minutes and the slurry then filtered through a vacuum filter. The filter cake was washed with distilled water until the pH of the filtrate was lowered to 7. The washed filter cake was dried at 110° C. in the drying oven. The dried powder was sieved through a 100 mesh screen.

The sieved powder was used for preparing porous filter discs. The powder was compacted in a double action die with a cylindrical cavity of a diameter of 2.75 inches. The following compacts were pressed:

TABLE 12

| Sample No. | Compaction pressure, e.s.i. | Thickness, mm. | Percent pore volume |
| --- | --- | --- | --- |
| 1 | 2 | 0.65 | 70.7 |
| 2 | 5 | 0.54 | 64.6 |
| 3 | 10 | 0.40 | 56.6 |

The green discs were sintered in a hydrogen atmosphere of −40° C. dewpoint at 1150° C. for two hours. During this treatment the zirconyl-ammino complex was decomposed to zirconium oxide which remained dispersed at the surface of the metal. The sintered discs had the following properties:

TABLE 13

| Sample No. | Thickness, mm. | Largest pore dia., microns | Average pore dia., microns | Percent pore volume |
|---|---|---|---|---|
| 1 | 0.41 | 1.75 | 0.75 | 26.3 |
| 2 | 0.35 | 1.0 | 0.40 | 21.6 |
| 3 | 0.27 | 0.5 | 0.25 | 15.0 |

The pore size was determined by the ASTM E128–61 method.

EXAMPLE 9

Test strips, 0.5 inch wide and about 2 inches long, were cut from sintered porous stainless steel discs, foil, and plates having the composition set forth below. The compositions were prepared in accordance with the procedures described in Examples 2, 4, 5, 6 and 7. Ductility of the test strips was determined by the bend test. The test strips were bent slowly around polished steel dowel pins. Care was taken to be quite certain that the bend specimen conformed at all times to the radius of the dowel pin. Bending was continued to 180° after spring back. The bend area was examined at a 50 times magnification with a binocular microscope to ascertain whether cracking had occurred. The degree of bend is described as $Xt$ where $X$ is determined as follows: a 0.005 inch thick foil is bent to 180° without failure over a $\frac{1}{16}$-inch diameter dowel pin, then the bend radius 0.03175 inch over 0.005 inch foil thickness ($t$) gives a bend radius of $6.35t$. The results obtained from these tests are the following:

TABLE 14

| Oxide coating | Coating weight, percent | Bend radius |
|---|---|---|
| MgO | 0.5 | 6t |
| MgO | 2 | 10t |
| MgO | 5 | 12t |
| MgO | 10 | 60t |
| ZrO₂ | 2 | 14t |
| ZrO₂ | 8 | 20t |
| ZrO₂ | 10 | 60t |
| Al₂O₃ | 2 | (¹) |
| Al₂O₃ | 10 | (¹) |

¹ No ductility.

The brightness of the various finished products was determined by visually comparing the above strips against each other. The results show that strips made with magnesia coated stainless steel powder are bright metallic silver white, shiny, and lustrous; the strips made with zirconia coated stainless steel powders are grey, partially shiny, with tendency to tarnish; and the strips made with alumina coated stainless steel powder are dull grey.

EXAMPLE 10

Two batches of tungsten powder containing, respectively 10 percent and 15 percent magnesia were made as follows. In a Warren blender were added the calculated quantities of magnesium hydroxide suspension known to the trade as "Phillips Milk of Magnesia." In this gelatinous suspension were dispersed the calculated quantities of less than 0.5 micron in size "submicron tungsten powder" Lot 1530-7-72 sold by Union Carbide Metals Company a division of Union Carbide Corporation, Niagara Falls, N.Y. The dispersion was allowed to mix for about 30 minutes and form a coating of magnesium hydroxide gel on the metal particles. The slurry was filtered through a vacuum filter. The filter cake was washed with denatured ethyl alcohol and allowed to air-dry. The dried powder was screened through a 400-mesh screen, placed into an Inconel tube furnace in hydrogen of approximately −40° C. dewpoint. The powder was heated to 800° C. for two hours.

The calcined magnesia coated tungsten powders containing 10 and 15% magnesium oxide were loaded into a dye with a 0.5 inch diameter cavity and compacted into discs at 2.5 tons per square inch pressure. The physical characteristics of the discs are the following.

TABLE 15

| Invested powder 11385 | MgO, wt. percent | Disc diam., mm. | Thickness, mm. | Percent theoretical density |
|---|---|---|---|---|
| 47–1 | 10 | 13.01 | 7.36 | 19.2 |
| 47–2 | 15 | 13.03 | 7.26 | 17.6 |

The discs were heated under a dry hydrogen atmosphere at 500° C. for three hours. Then the temperature was raised to 800° C. for one hour and finally to 1200° C. for two hours. The discs had the following physical characteristics.

TABLE 16

| Invested powder 11385 | MgO, wt. percent | Percent of theoretical density |
|---|---|---|
| 47–1 | 10 | 21.7 |
| 47–2 | 15 | 21.7 |

These discs were sintered for 2 hours at 1250° C. under a vacuum of $5 \times 10^{-5}$ torr. During this operation the percent of theoretical density went to 37.6 and 34.5 respectively.

The sintered discs were placed in dilute hydrochloric acid (5% by volume) over the weekend to dissolve the magnesia coating. The acid treated discs were washed with distilled water, the water rinsed off with acetone, and the latter allowed to evaporate. The fired leached discs had the following physical characteristics.

TABLE 17

| Invested powder 11385 | Weight loss, percent | Diameter, mm. | Thickness, mm. | Percent theoretical density |
|---|---|---|---|---|
| 47–1 | 10.2 | 10.10 | 5.72 | 34.3 |
| 47–2 | 15.5 | 10.20 | 5.74 | 29.8 |

EXAMPLE 11

The 182 grams of magnesium hydroxide known in the trade as "Phillips Milk of Magnesia," were dispersed 90 grams of flake shaped −20 microns tungsten powder sold by U.S. Bronze Powders, Inc. This powder was dispersed in the gelatinous magnesium hydroxide suspension, allowed to mix for about 30 minutes, and form a gel coating of magnesium hydroxide on the metal particles. The slurry was filtered through a vacuum filter. The filter cake was washed with denatured ethyl alcohol. The denatured ethyl alcohol wash was followed by acetone wash. The acetone-washed filter cake was allowed to air dry. The air dried powder was screened through a 400-mesh screen.

The powder was pressed at 2.5 t.s.i. into a ½″ diameter disc to a theoretical density of 20%. The tungsten disc was dried at 100° C. under vacuum. The dried disc was heated to 500° C. for 3 hours. The temperature was then raised to 800° C. for one hour after which sintering was conducted for 2 hours at 1150° C. in a dry hydrogen atmosphere at −40° C. dewpoint. The sintered disc which had a percent theoretical density of 33.3 was placed in a water solution containing 10% by volume of hydrochloric acid to dissolve out the magnesia. The leaching was carried out at room temperature overnight. The leached disc was washed with distilled water, rinsed with acetone, and allowed to dry. The resulting disc had a pore volume of 69.5% and the loss in weight was 8.5%.

What is claimed is:

1. Method of making a porous sintered metal material having a network of pore channels of diameters in the order of from less than one micron to about 25 microns with at least 70 percent of said pore channels being interconnected comprising the steps of coating flake-shaped metal particles with a hydroxide gel which upon heating at temperatures below the oxidation temperature of said metal particles decomposes to the corresponding inert oxide dispersoid particles bonded to said metal particles and forming with said sintered metal particles a wetting angle of at least 90° as measured from the sintered metal-oxide particle interface to the sintered metal-atmosphere interface, the volume of corresponding oxide in said gel coating taken on a dry basis of the oxide-metal mixture resulting in formation of said sintered material having said interconnected pore channels of said diameters, compacting said coated flake-shaped metal particles to a green compact substantially free of laminations and subjecting said green compact to a heat treatment comprising a first heating at temperatures below the oxidation and sintering temperatures of said metal particles to decompose said gel coating to said corresponding oxide and a second heating at temperatures at least sufficient to promote sintering between said metal particles up to temperatures of 0.9 the absolute melting point of said metal particles for a time sufficient to result in a sintered material having a density from about 30 percent to 90 percent theoretical density.

2. A method in accordance with claim 1 wherein said inert oxide dispersoid is magnesia which is chemically removed from said sintered material while retaining in said sintered material the said interconnected pore channels having the said diameters.

3. A method in accordance with claim 1 wherein said hydroxide gel coating is essentially salt free.

4. A method in accordance with claim 1 wherein the volume of said corresponding oxide is at least 0.1 percent.

5. A method in accordance with claim 1 wherein said metal particles are selected from the group consisting of stainless steel, nickel-molybdenum iron alloys, nickel-chromium alloys and tungsten.

6. A method in accordance with claim 1 wherein said inert oxide dispersoid is selected from the group consisting of magnesia, zirconia and alumina.

7. A method in accordance with claim 1 wherein the volume of said corresponding oxide is from about 0.1 percent to 20 percent.

8. Method of making a porous sintered metal material having a network of pore channels of diameters in the order of from less than one micron to about 25 microns with at least 70 percent of said pore channels being interconnected comprising the steps of coating flake-shaped metal particles with a hydroxide gel which upon heating at temperatures below the oxidation temperature of said metal particles decomposes to the corresponding inert oxide dispersoid particles bonded to said metal particles and forming with said sintered metal particles a wetting angle of at least 90° as measured from the sintered metal-oxide particle interface to the sintered metal-atmosphere interface, the volume of corresponding oxide in said gel coating taken on a dry basis of the oxide-metal mixture resulting in formation of said sintered material having said interconnected pore channels of said diameters, subjecting said coated metal particles to a heat treatment below the oxidizing and sintering temperatures of said metal particles to initially decompose said gel coating to said corresponding oxide and to subsequently at last partially anneal said oxide coated particles, compacting said heat treated particles to a green compact substantially free of laminations and sintering said green compact at temperatures at least sufficient to promote sintering between said metal particles up to temperatures of 0.9 the absolute melting point of said metal particles for a time sufficient to result in a sintered material having a density from about 30 percent to 90 percent theoretical density.

9. A method in accordance with claim 8 wherein said inert oxide dispersoid is magnesia which is chemically removed from said sintered material while retaining in said sintered material the said interconnected pore channels having the said diameters.

10. A method in accordance with claim 8 wherein said hydroxide gel coating is essentially salt free.

11. A method in accordance with claim 8 wherein the volume of said corresponding oxide is at least 0.1 percent.

12. A method in accordance with claim 8 wherein said metal particles are selected from the group consisting of stainless steel, nickel-molybdenum-iron alloys, nickel-chromium alloys and tungsten.

13. A method in accordance with claim 8 wherein said inert oxide dispersoid is selected from the group consisting of magnesia, zirconia and alumina.

14. A method in accordance with claim 8 wherein the volume of said corresponding oxide is from about 0.1 percent to 20 percent.

References Cited

UNITED STATES PATENTS

| | | | |
|---|---|---|---|
| 3,066,391 | 12/1962 | Vordahl | 75—212 X |
| 3,181,947 | 5/1965 | Vordahl | 75—212 X |
| 3,397,968 | 8/1968 | Lavendel | 29—182.5 |

CARL D. QUARFORTH, *Primary Examiner.*

A. J. STEINER, *Assistant Examiner.*

U.S. Cl. X.R.

29—182.5; 75—211, 212, 222